United States Patent [19]
Tesch

[11] Patent Number: 5,543,193
[45] Date of Patent: Aug. 6, 1996

[54] WOOD COVERING, PARTICULARLY WOOD FLOOR COVERING

[76] Inventor: Gunter Tesch, Ave. Jean-Marie Musy 15, CH-1700 Fribourg, Switzerland

[21] Appl. No.: 185,864

[22] PCT Filed: May 25, 1993

[86] PCT No.: PCT/EP93/01316

§ 371 Date: Jan. 25, 1994

§ 102(e) Date: Jan. 25, 1994

[87] PCT Pub. No.: WO93/24295

PCT Pub. Date: Dec. 9, 1993

[30] Foreign Application Priority Data

May 26, 1992 [DE] Germany .......................... 42 17 438.4
Oct. 21, 1992 [DE] Germany .......................... 42 35 530.3
Jan. 19, 1993 [DE] Germany .......................... 43 01 262.0

[51] Int. Cl.⁶ ..................................................... B32B 1/04
[52] U.S. Cl. .......................... 428/285; 156/297; 156/299; 156/308.2; 156/555; 428/212; 428/218; 428/285; 428/287; 428/402; 428/409; 428/49; 428/187
[58] Field of Search ................................. 428/68, 76, 106, 428/116, 118, 285, 537.1, 296, 283, 246, 212, 218, 323, 327, 337, 287, 187, 49, 402, 409; 156/297, 299, 308.2, 555

[56] References Cited

U.S. PATENT DOCUMENTS

| | | | |
|---|---|---|---|
| 3,729,368 | 4/1973 | Ingham et al. | 161/119 |
| 4,045,603 | 8/1977 | Smith | 428/537.1 |
| 4,097,648 | 6/1978 | Pringle | 428/537.1 |
| 4,112,145 | 9/1978 | Cisterni | 428/537.1 |
| 4,241,133 | 12/1980 | Lund et al. | 428/537.1 |
| 4,865,912 | 9/1989 | Mitsumata | 428/285 |
| 5,049,431 | 9/1991 | Heckel et al. | 428/138 |

FOREIGN PATENT DOCUMENTS

| | | |
|---|---|---|
| 0105074 | 4/1984 | European Pat. Off. . |
| 0396891 | 11/1990 | European Pat. Off. . |
| 2359253 | 2/1978 | France . |
| 2719361 | 11/1978 | Germany . |
| 3715646 | 11/1988 | Germany . |
| 4135658 | 5/1993 | Germany . |
| 2085357 | 4/1982 | United Kingdom . |

*Primary Examiner*—James J. Bell
*Attorney, Agent, or Firm*—Bacon & Thomas

[57] ABSTRACT

Disclosed is a wood covering, especially a wood floor covering with a wood layer (2) and a support (3). The wood layer (2) and the support (3) are permanently bonded to one another. The support (3) consists of pieces of thermoplastic synthetic foil material (5), compressed by the action of pressure and temperature and bonded together at least partially.

29 Claims, 1 Drawing Sheet

WOOD COVERING, PARTICULARLY WOOD FLOOR COVERING

FIELD OF THE INVENTION

The invention concerns a wood covering, particularly a wood floor covering with an upper layer formed by a layer of wood and a support.

BACKGROUND OF THE INVENTION

Wood coverings, particularly wood floor coverings are known as parquet, flooring, veneers and the like. Parquet floors are laid in such a way that individual parquet slabs are laid on a substrate, usually a floor, to form various patterns, and cemented to the same. There are also ready-made parquet floors in which the individual slabs are already assembled into patterns and sold as tiles. In this case, too, the individual slabs must be laid alongside one another and cemented to the subfloor. In addition to the tedious installation, parquet floors have the disadvantage that they must be sealed after being laid and later maintained with waxes. These materials are for the most part injurious to health. With flooring there are other problems. The individual wooden boards must be laid alongside one another on the substrate and attached to it. The laying of these floors is expensive, and they must also be varnished. With long use these floors begin to squeak. All wood floors present problems with dimensional stability, particularly relative to the effects of moisture, because the wood is normally sensitive to the effects of moisture and weathering. Moreover, the handling of numerous pieces of wood or wood tiles during their transport to the installation site is particularly inconvenient. These materials cannot be stored just anywhere; especially dry storage space is needed. Furthermore, parquet floors and wood flooring do not absorb sound and are thus also of limited use.

SUMMARY OF THE INVENTION

The goal of the present invention is to make available a wood covering, especially a wood floor covering, which does not exhibit the disadvantages cited above, is easy to lay, absorbs noise and is resilient to the step.

This goal is achieved by the wooden covering as claimed. A process for the manufacture of the wood covering is also provided.

DESCRIPTION OF THE DRAWINGS

The invention will be described in detail with reference to the following drawings in which.

DETAILED DESCRIPTION

Figure 1:
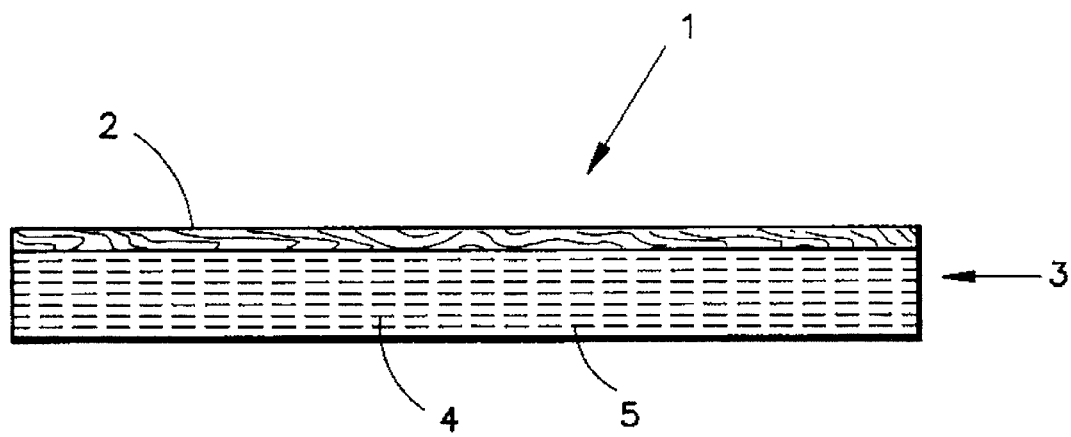
FIG. 1 is a schematic drawing of a section through the inventive wood covering.

The inventive floor covering exhibits an upper layer formed by a wood layer, able to be walked on and visible after its installation, which is attached to a support not visible once it is installed. The support is formed by thermoplastic synthetic foil material in pieces, compressed by the action of pressure and heat and bonded together at least partially. The upper layer and the support are bonded together permanently. Such a wood covering combines the advantages of a covering made of natural materials with the advantages of particularly easy handling. Because the support consists of at least partially consolidated pieces of plastic foil, and the bonding of the plastic foil exhibits good cohesion but is still so loose that bubbles and even small cavities are present in the compacted plastic material, it is particularly elastic. If a layer of wood is bonded to this carrier layer, the result is a wood covering exhibiting favorable elastic properties: it is resilient to the step and absorbs noise. Sound deadening is one of the important properties of the inventive wood floor covering. Moreover, the inventive wood covering is dimensionally stable. Due to the carrier layer consisting of plastic foil, the wood covering is waterproof and dimensionally stable even when subjected to the influences of moisture and weathering. Other materials which are not thermoplastic can also be mixed in with the thermoplastic synthetic foil layers. In particular, if the elasticity and the sound-damping properties of the wood covering are to be increased, it is also possible to add textile materials to the plastic material of the support, preferably in the form of pieces or filaments. The addition of these materials makes the support looser and thus more resilient to the step and absorptive of sound.

In one embodiment of the invention, the thermoplastic synthetic material is a polyolefin. Particularly suitable are polyethylene foils. The polyethylene foil pieces are particularly easy to handle, and the bonding of the individual pieces of polyethylene foil under the influence of pressure and temperature is very good, the temperature being within the softening temperature range of the plastic.

It is advantageous for the cross section of the support to exhibit a gradient structure, that is to say, for the degree of compression of the foil pieces to change continuously over the cross section. If the density decreases in the direction of the upper layer/wood layer, the invented wood covering will be particularly resilient to the step; if the density increases in the direction of the upper layer, the sound-damping properties of the wood floor covering will be particularly good.

The invention provides that the support will have a thickness between 3 mm and 10 mm and that the thickness of the wood layer will be at least about 1 mm and maximally 3 mm. A thin wood covering (for example, 3 mm support and 1 mm wood layer) is particularly suitable for furniture or interior wall coverings. It is easily formed and pliable and can be easily laid, for example, around the corners of furniture. Such a wood covering can also be used as a kind of wood veneer; the support is in this case made sticky by the application of heat and thereby bonded to the surface to be covered. The covering can for example be "ironed" onto the surface of the article to be covered. The wood layer can advantageously take different forms. It can consist of wood veneer or precious wood veneer; but it can also be formed by parquet pieces or mosaic parquet. It is also possible to apply relatively small wood pieces in a random arrangement to the support, for example, by means of a roller with holes under a vacuum, an entirely new surface being formed. Such a wood covering can even have a rough surface, particularly when wood chips are used. The chips can for example be from 2 mm to 3 mm wide and from 8 mm to 15 mm long and interlock with one another. It is even possible to use chips of precious woods, they impart a corresponding appearance to the surface. The chips can also be pressed into the support, so that a smooth or rough surface will arise under the roller or press. Advantageous is the use of an adhesive between the foil pieces and the wood chips. They can then even be sanded, or filled out with a hardening material which will also consolidate them from above. In that way, such a wood floor covering is made smooth and resistant to wear. If the support is particularly thin and the wood layer consists, for example, of individual wood segments, such a wood covering will thus be so elastic that it can be rolled up. This is particularly advantageous for many applications, for example, in the case of wall and furniture coverings.

The appearance of the wood covering is established during its manufacture by a planned arrangement of the individual wood slabs, wood segments or wood pieces to form a pattern, so that ready-made wood floor coverings can be sold, even as tiles with a size, for example, of 50 cm×50 cm, with a specific and/or desired surface pattern.

A different embodiment of the invention is produced if the support is provided with a layer of wood on both sides, thus, on its upper side and lower side. Such an embodiment yields a wood covering, by virtue of the wood layer on both sides, a kind of wood slab, which is waterproof due to the plastic support.

A process for manufacturing the inventive wood floor covering is implemented by spreading several layers of plastic foil pieces to form a layer; a layer of wood is laid down upon this layer and the two layers are bonded together by the action of pressure and temperature, the plastic pieces being simultaneously compressed and at least partially bonded to one another. A single operation is thus necessary to produce a wood floor covering ready to be laid. Usually the adhesive action of the softened plastic material at increased temperature and pressure is sufficient to bond the wood layer to the plastic layer. If a still firmer bond is to be achieved or if the support is to exhibit different degrees of compression, the plastic can be provided with an additional, binding, thermoplastic layer which will improve the bond still further.

The process can be varied by first precompressing the plastic material with the action of pressure and heat; the wood layer being laid down upon the precompressed material and bonded to the same with additional pressure and heat, the material of the support being subjected to final compression in this procedural step.

The gradient structure of the density of the support cross section is achieved by varying the pressure and temperature. In the direction of decreasing density of the plastic material, the temperature and pressure values decrease and vice versa.

The use of flake-like foil pieces makes the process of manufacturing the inventive wood covering particularly simple. The foil pieces can be measured out very simply. A layering of the plastic material into individual layers is not necessary, the material being poured to a required depth. Simpler handling results with the use of the foil pieces which have been given a three-dimensional shape, for example, by a deep-drawing process, partial shrinking or stretching. If scrap foils or foil remnants are used, these will have at least differing thicknesses and will be deformed by the size reduction process, such as tearing or cutting and thus "increased in volume". The depth of the heaped-on or, scattered material can differ over the surface of the covering to be produced. The places exhibiting more material will be more greatly compressed by the pressing or rolling process than those places with less material. In this way, surface regions with differing degrees of compaction will arise. The total production process of the inventive floor covering is simple. The bonding of the upper layer to the support can take place in one or several operations, the temperatures and pressures necessary being only just high enough to effect the attachment of the foil pieces to one another at the melting temperature of the plastic. The underside of the floor covering can be additionally equipped with a fiber-glass fleece, with a polyester fabric or a glass fiber coating. This layer will make the bonding of the wood covering to the substrate easier and also contributes to dimensional stability.

The wood covering 1 exhibits a wood layer 2 and a support 3. The inventive wood floor covering can also be manufactured in the form of tiles with supports of varying thickness, making particularly good compensation for unevenness in the floor possible. It is a particular advantage of the invention that the upper wood layer of the floor covering can be provided with a wear-resistant and non-skid coating during its manufacture. A subsequent coating/sealing of the floor covering after installation is thus not necessary.

When the wood covering is used for surfacing furniture or interior walls, its upper layer, if it for example consists of wood veneer, can thus be slit to permit the wood covering to be laid even around corners. If the wood covering is to be made so that it can be rolled up, and the upper layer is to be continuous, it can also be slit for this purpose and then, after installation, the slit spots can be hidden with a filler.

Figure 2:
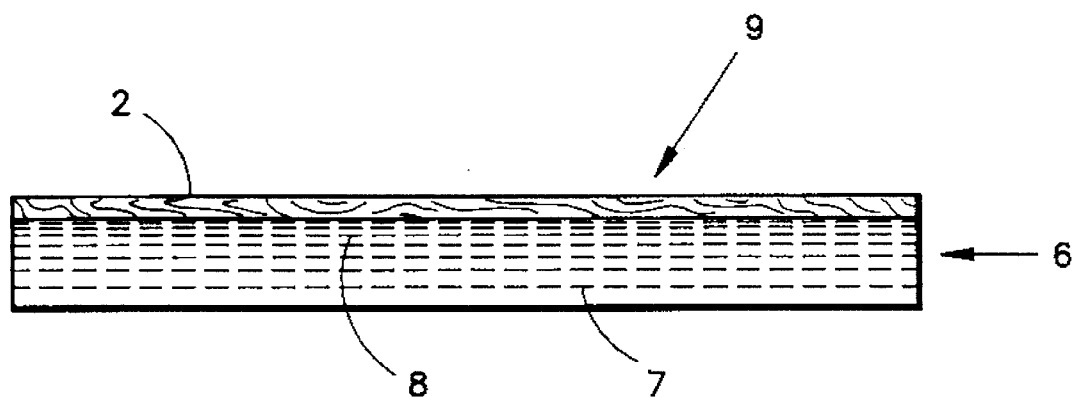
FIG. 2 is a schematic view of a section through the inventive wood covering with a graded density structure.

The wood material layer 2 forms the visible surface of the wood covering. The support 3 is not visible during use, because it is covered over by the wood layer 2. The support 3 consists of pieces 5 of thermoplastic synthetic foil bonded together under the action of pressure and heat. The structure of support 3 can exhibit a constant density (FIG. 1) or, as illustrated in FIG. 2, a density continuously varying over the cross section of the support 6. For particularly good resilience, it is advantageous for the compression of the plastic material in the region 7 distant from the surface to have a density lower than in the region near the surface 8. The process of manufacture is particularly advantageous, if flake-like sheet pieces 4 are used. The compression and the distribution of such sheet pieces are very simple.

What is claimed is:

1. A wood covering including an upper layer formed by a wood layer (2) and a support (3,6) permanently bonded to the upper layer (2), said support comprising pieces of thermoplastic synthetic foil (5) compressed and at least partially bonded to one another by pressure and heat.

2. The wood covering according to claim 1 wherein the foil pieces (5) comprises polyolefin foils.

3. The wood covering of claim 1, wherein the foil pieces include polyethylene foils.

4. The wood covering according to claim 1, further including non-thermoplastic materials mixed in with the pieces of thermoplastic synthetic foil.

5. The wood covering according to claim 1, wherein the support (6) exhibits varying degree of density over its cross section.

6. The wood covering according to claim 5, wherein the density variation is continuous.

7. The wood covering according to claim 1, wherein various surface regions of the support (3,6) have different degrees of compaction.

8. The wood covering according to claim 1, wherein the support (3,6) includes layers of fiber-glass.

9. The wood covering of claim 1, wherein the support includes glass fiber fleece.

10. The wood covering according to claim 1, wherein the support (3,6) includes air bubbles.

11. The wood covering of claim 1, wherein the support includes cavities.

12. The wood covering according to claim 1, wherein the wood layer (2) includes wood flakes.

13. The wood covering according to claim 12, wherein the wood covering is sufficiently flexible to be rolled up.

14. The wood covering according to claim 1, wherein the support (3,6) is bounded on an upper surface and a lower surface by a layer of wood.

15. The wood covering according to claim 1, wherein the support (3,6) has a thickness in the range of 3 mm to 10 mm.

16. The wood covering according to claim 1, wherein the wood layer has a thickness in the range of approximately 1 mm to approximately 3 mm.

17. The wood covering according to claim 1, wherein the support (3,6) is provided with an underlayer which comprises fiber-glass fleece.

18. The wood covering according to claim 1, wherein the support (3,6) is provided with an underlayer which comprises glass fiber coating.

19. The wood covering according to claim 1, wherein the support (3,6) is provided with an underlayer which comprises polyester fabric.

20. The wood covering according to claim 1, wherein the upper layer (2) is provided with a mosaic-like appearance.

21. A process for the manufacture of a wood covering according to claim 1, comprising the steps of: pouring pieces of thermoplastic synthetic material in several applications to form a layer of pieces; placing a wood layer (2) on the layer of pieces; and bonding the wood layer and the layer together by pressure and heat to form a carrier layer.

22. The process according to claim 21, further including the step of laying down a second wood layer (2) upon the carrier layer (3,6); and bonding the carrier layer to the second wood layer with pressure and heat.

23. The process according to claim 21, wherein the heat corresponds to a softening temperature range for the thermoplastic synthetic material.

24. The process according to claim 23, further including the step of applying a hot-melt adhesive layer on the carrier layer prior to bonding the carrier layer to the second wood layer.

25. The process according to claim 21, wherein the pressure and heat are applied with a calendar roller.

26. The process according to claim 21, wherein the pieces have a three-dimensional configuration prior to compression.

27. The process according to claim 21, wherein the pieces have a flake-like configuration prior to compression.

28. The process according to claim 21, wherein the pieces are mixed with textile material.

29. The process according to claim 21, wherein the layer of pieces has a variable thickness.

* * * * *